United States Patent Office — 2,883,379 — Patented Apr. 21, 1959

2,883,379

PROCESS FOR PRODUCING 3-KETO-$\Delta^{1,4,6}$-STEROIDS

Walter T. Moreland, New London, Conn., and Eugene J. Agnello, Jackson Heights, N.Y., assignors to Chas. Pfizer & Co., Inc., Brooklyn, N.Y., a corporation of Delaware No Drawing. Application August 18, 1958
Serial No. 755,420

7 Claims. (Cl. 260—239.55)

This invention is concerned with an improved process for producing 3-keto-$\Delta^{1,4,6}$-steroid compounds from 3-keto A-ring saturated, 3-keto-$\Delta^4$-, and 3-keto-$\Delta^{4,6}$-steroids.

Various methods have been utilized in the past for the introduction of double bonds at the 1,2-, 4,5- and 6,7- positions of steroid compounds. For example, 3-keto compounds have been treated with bromine to introduce bromine at the 2- and/or 4-positions, or with N-bromosuccinimide to introduce bromine at the 6-position. These reactions are followed by dehydrobromination to introduce the double bonds. A significant advance was the discovery that similar results could be obtained in one step by treatment of the 3-keto steroid with a quinone. This process, described in copending applications, Serial No. 633,538, filed January 11, 1957, and Serial No. 672,363, filed July 17, 1957, is well adapted to the preparation of 3-keto-$\Delta^{4,6}$-steroids. However, when applied to the synthesis of 3-keto-$\Delta^{1,4,6}$-steroids on a one-gram or larger scale it leads to the formation of grossly impure products which are not amenable to purification by any known means. In particular, they contain major proportions of the 3-keto-$\Delta^{4,6}$-analogs resulting from incomplete dehydrogenation. This is true even where a large excess of the quinone is employed.

It has now been discovered that it is possible to prepare 3-keto-$\Delta^{1,4,6}$-compounds of high purity on any scale, provided certain critical conditions are employed. According to this novel process, the 3-keto steroid is treated with a quinone having an oxidation-reduction potential of less than about —0.5 at a temperature of from about 110° C. to about 155° C. in an alcohol solvent in the presence of an additive selected from the group consisting of subdivided calcium carbonate, strontium carbonate, metallic germanium, and glass. Most unexpectedly, however, no improvement is observed if diatomaceous earth or activated carbon is employed in place of the enumerated additives. Even more surprising is the fact that while calcium carbonate is effective, barium carbonate is not.

The solid additives employed to promote the reaction of this invention should be particulate; that is, they should be in the form of subdivided particles. For example, while glass helices or ground glass are employed with success, it is not sufficient merely to employ a glass-lined reaction vessel. However, effectiveness of the added solid does not vary appreciably with particle size. Thus, powdered calcium carbonate having a particle diameter of less than 15 microns may be utilized with success, but the coarse product commonly known as marble chips and having a particle diameter in excess of one centimeter is likewise effective. The most desirable particle size will ordinarily be determined by the size and dimensions of the equipment employed. Thus, it may be found most economical to employ the less expensive, larger particles in large equipment, while in small equipment it is sometimes desirable to use smaller particles so as to decrease the possibility of interference with, for example, the stirring mechanism. The quantity of solid additive employed is not critical, although best results are usually obtained with at least about 1% by weight of the reaction mixture, and it is generally unnecessary to use more than about 20% by weight. Of course, more than this can be employed but ordinarily no more will be used than is required to fill the reaction vessel to the liquid surface.

The reaction temperature employed in the process of this invention may range from about 110° C. to about 155° C., preferably from about 125° C. to about 140° C. At temperatures much below 110° C. the reaction will usually not go to completion, whereas at temperatures much above 155° C. side reactions and decomposition are likely to occur.

The solvent employed in the process of this invention is preferably a saturated aliphatic alcohol of up to nine carbon atoms containing primary or secondary alcohol groups. It is convenient to employ an alcohol having a boiling point at atmospheric pressure of from about 110° C. to 155° C., the preferred range of reaction temperature, but this is not essential. Thus, an alcohol boiling below 110° C. may be employed for reaction in a pressure vessel and, likewise, an alcohol boiling above 155° C. may be utilized below its boiling point. Among the alcohols which may be employed for this invention are propanol-1, 2-methyl-propanol-1, 2-methyl-butanol-4, pentanol-1, hexanol-1, 2-ethyl-butanol-1, 2-ethyl-hexanol-1, pentanol-2, 2-methyl-butanol-3, pentanol-3, 4-methyl-pentanol-2, and their mixtures.

Quinones used in carrying out the process of this invention are those which under standard conditions have oxidation-reduction potentials of less than —0.5, and preferably those having potentials of —0.65 or less. Oxidation-reduction potentials are readily determined by reference to standard scientific texts (see "Handbook of Chemistry and Physics," 31st edition, p. 1442, Chemical Rubber Co., 1949, and Latimer and Hildebrand, "Reference Book of Inorganic Chemistry," revised edition, pp. 474–481, Macmillan, 1940). Quinone itself (also known as benzoquinone), chloranil, 2,6-dichlorobenzoquinone, toluquinone, 1,2-naphthoquinone, hydroquinone and xyloquinone are among those successfully employed in this process.

The quantity of the quinone is not critical. Although a minimum of one mole is theoretically required for each double bond introduced, some of the desired product is nonetheless produced even with less than one mole. Ordinarily from about one to about three moles of the quinone will be employed for each double bond introduced, and preferably from about 1.1 to about 1.5 moles. For example, in the conversion of a 3-keto-$\Delta^4$- to a 3-keto-$\Delta^{1,4,6}$-steroid from about two to about six moles of the quinone will be usually employed, the preferred quantity being from about 2.2 to about 3. Even more than three moles of the quinone can be employed for each double bond introduced, but ordinarily any increase in yield thereby attained is not sufficient to justify the added expense.

The starting materials for the present process are known compounds which are obtainable by a variety of procedures described in the chemical literature. The 3-keto steroid compounds used as starting materials contain from 18 to 21 carbon atoms and may be substituted with a variety of groups. For example, they may contain hydroxyl groups at the 11,14,16,17 and/or 21-positions; keto groups at the 11,17 and/or 20-positions; methyl groups at the 2,6 and/or 16-positions; halogen at the 15,16 and/or 21-positions; an acyloxy group at the 21-position. The steroids may contain double bonds at the 4,5; 6,7; 9,11; or 14,15-positions, or certain combinations of these. They may contain epoxy groups at the 9,11 and/or the 14,15-positions.

Among the compounds which may be prepared by this novel process are: $\Delta^{1,4,6}$-pregnatriene-17$\alpha$,21-diol-3,20- dione; 2-methyl-$\Delta^{1,4,6}$-pregnatriene-11$\beta$,17$\alpha$,21-triol-3,20-dione; 6-methyl-$\Delta^{1,4,6}$-pregnatriene-17$\alpha$,21 - diol - 3,11,20-trione; $\Delta^{1,4,6}$-pregnatriene-17$\alpha$,21 - diol - 3,11,20 - trione; $\Delta^{1,4,6}$-pregnatriene-11$\beta$,17$\alpha$,21 - triol - 3 - 20 - dione; 15$\beta$-bromo-$\Delta^{1,4,6}$-pregnatriene-14$\alpha$,17$\alpha$,21-triol-3,11,20-trione; 9$\beta$,11$\beta$-oxido-$\Delta^{1,4,6}$-pregnatriene-17$\alpha$,21-diol-3,20 - dione; $\Delta^{1,4,6}$-pregnatriene-11$\beta$,14$\alpha$,17$\alpha$,21-tetrol-3,20-dione; 14$\alpha$, 15$\alpha$-oxido-$\Delta^{1,4,6}$-pregnatriene-17$\alpha$,21-diol-3,11-20 - trione; $\Delta^{1,4,6}$-pregnatetraene-11$\beta$,17$\alpha$,21-triol-3,20-dione; $\Delta^{1,4,6}$-androstatriene-17$\beta$-ol-3-one; $\Delta^{1,4,6}$-androstatriene-3,11,17-trione; and the esters of those compounds having a 21-hydroxyl group or if a derivative of androstene, a 17-hydroxyl group. These esters include, for example, the benzoates, acetates, propionates, butyrates, hemisuccinates, and other hydrocarbon carboxylic acid groups having from one to ten carbon atoms.

Compounds prepared by the process of this invention are useful for various therapeutic purposes. For example, the $\Delta^{1,6}$-bisdehydro analogs of cortisone and hydrocortisone have valuable anti-inflammatory action when administered to animals, including humans. Others are derivatives of progesterone and possess similar activity. Derivatives of androstene are useful in correcting nitrogen imbalance after serious injury or surgery.

The 9,11-oxido compounds prepared by this process do not possess appreciable therapeutic activity. They are, however, valuable intermediates for the preparation of therapeutically active 9$\alpha$-halo-11$\beta$-hydroxy compounds by treatment with halogen acids according to known procedures.

In the operation of this new process the 3-keto steroid compound which is to be used as a starting material is placed in a solvent of the type described and the selected quantity of the quinone is introduced. Subdivided calcium carbonate, strontium carbonate, germanium, or glass is then added to the mixture in the reaction vessel. If the solvent chosen is one which produces a reaction mixture boiling below about 110° C. the vessel employed will be one suitable for operation under superatmospheric pressure. An agitator or other means for suspending the subdivided solid in the reaction mixture is preferably provided. However, if the solvent selected is such that the reaction is conveniently conducted at the boiling point of the reaction mixture, additional means for agitation may often be omitted.

The mixture is then heated to a temperature of from about 110° C. to about 155° C., and, most conveniently, at the boiling point of the solvent if it boils within this range. The reaction may be carried out in an inert atmosphere, for example, under nitrogen, to minimize decomposition of the starting material and product, although this is not essential. The duration of the reaction is not critical, since some product forms almost immediately, but optimum results are usually obtained in from about one-half to about six hours, and from about one to about three hours is often adequate.

Equivalent procedures for carrying out the process of this invention will be apparent to those skilled in the art. For example, a heated solution of the 3-keto steroid compound and the quinone, in a solvent of the type described, may be passed over the particulate solid contained in a column.

The product of the dehydrogenation reaction may be isolated by any of a number of means apparent to those skilled in the art. For example, the added solid is usually first separated, by filtration or decantation, and, if desired, reserved for washing and reuse. The solvent is then removed by evaporation or steam-distillation, preferably under reduced pressure. The product thus obtained may be further purified by extraction with a low-boiling solvent, such as methylene chloride or chloroform, and washing with an aqueous alkaline solution, such as a solution of potassium or sodium hydroxide. The washed solution is then concentrated under atmospheric or reduced pressure to obtain the desired product.

Some of the advantages of this novel process will be better understood by reference to the table below, in which the conversion of hydrocortisone acetate to the corresponding $\Delta^6$- and $\Delta^{1,6}$-compounds with chloranil is reported.

| Added Solid | Product Composition | |
| --- | --- | --- |
| | $\Delta^6$ | $\Delta^{1,6}$ |
| none[a] | 60 | 40 |
| CaCO$_3$ (<15$\mu$)[a] | | 95 |
| CaCO$_3$ (ca. 1 cm.)[a] | | 95 |
| SrCO$_3$[a] | | 95 |
| CaCO$_3$[b] | | 95 |
| glass helices (35 g.)[c] | 10 | 90 |
| CaCO$_3$[c] | 10 | 90 |
| Germanium (1 g.)[c] | 3 | 97 |

[a] 1 g. F. acetate, 1.5 g. chloranil, 5 g. added solid, in 35 ml. isoamyl alcohol, refluxed 1¼ hrs.
[b] As in (a) with n-hexanol in place of isoamyl alcohol.
[c] 1 g. F. acetate, 3.7 g. chloranil, 5 g. added solid, in 35 ml. sec.-amyl alcohol, refluxed 3 hrs.

The following examples are given by way of illustration and are not to be regarded as limitations of this invention, many variations of which are possible without departing from its spirit or scope:

EXAMPLE I $\Delta^{1,4,6}$-pregnatriene-11$\beta$,17$\alpha$,21-triol-3,20-dione 21-acetate 50 g. $\Delta^4$-pregnene-11$\beta$,17$\alpha$,21-triol-3,20-dione 21-acetate, 75 g. chloranil and 250 g. calcium carbonate in 1750 ml. isoamyl alcohol are refluxed with stirring for 75 minutes. The suspension is cooled to room temperature and stirred an additional 30 minutes. The reaction mixture is then filtered, concentrated under reduced pressure, and steam-stripped in vacuum until only water distills. The aqueous residue is cooled and extracted with 1250 ml. methylene chloride. This mixture is clarified with a filter-aid and the cake is extracted with fresh methylene chloride. The combined methylene chloride extracts are washed with 5% potassium hydroxide until no more color can be removed, and then with aqueous acetic acid and with water. The methylene chloride solution is then filtered and concentrated to 745 ml. In order to reacetylate any product which may have been hydrolyzed by the alkaline wash, the concentrate is next treated with pyridine and acetic anhydride. After standing overnight the mixture is washed with hydrochloric acid to remove the pyridine, and then is water-washed and concentrated to 125 ml. 500 ml. benzene is added and the concentration is continued to a head temperature of 78–80° C. The product is isolated from the benzene slurry by filtration. After benzene-washing and vacuum-drying 30.8 g. (a 62% yield) of high-purity product melting at 207–210.2° C. is obtained. The ultra-violet spectrum shows $\lambda\lambda_{max}^{MeOH}$ 223 m$\mu$ ($\epsilon$ 12,500), 255 m$\mu$ ($\epsilon$ 9,600), 300 m$\mu$ ($\epsilon$ 12,000)

When the experiment is repeated omitting the calcium carbonate, less than a 5% yield of the desired product is obtained in admixture with an equal quantity of the 3-keto-$\Delta^{4,6}$-analog.

EXAMPLE II

9$\beta$,11$\beta$-oxido-$\Delta^{1,4,6}$-pregnatriene-17$\alpha$,21-diol-3,20-dione 21-acetate 1 g. 9$\beta$,11$\beta$-oxido-$\Delta^4$-pregnene-17$\alpha$,21-diol-3,20-dione 21-acetate is treated as in Example I with appropriate changes in scale. The product is 0.25 g. (25% yield) of nearly white powder, M.P. 211–223° C. The ultraviolet spectrum shows $\lambda\lambda_{max}^{MeOH}$ 220–223 m$\mu$ ($\epsilon$ 11,300), 259–264 m$\mu$ ($\epsilon$ 11,500), 295–299 m$\mu$ ($\epsilon$ 11,700)

When the experiment is repeated omitting the calcium carbonate, the product obtained contains a major proportion of the 3-keto-$\Delta^{4,6}$-analog.

EXAMPLE III $\Delta^{1,4,6}$-pregnatriene-11β,17α,21-triol-3,20-dione 21-acetate 1 g. $\Delta^4$-pregnene-11β,17α,21-triol-3,20-dione 21-acetate, 3 g. chloranil and 1 g. germanium metal (pulverized) in 35 ml. mixed sec.-amyl alcohols are refluxed for 3 hours. (The solvent can be obtained from the Matheson Coleman and Bell Company.) Purification as in Example I gives the desired product.

EXAMPLE IV $\Delta^{1,4,6}$-androstatriene-17β-ol-3-one 17-acetate 20 g. $\Delta^4$-androstene-17β-ol-3-one 17-acetate, 75 g. chloranil and 125 g. calcium carbonate in 875 ml. isoamyl alcohol are refluxed with stirring for 75 minutes. After hot filtration the solution is evaporated to dryness under reduced pressure and the residue dissolved in 500 ml. chloroform. The chloroform is washed with 5% sodium hydroxide followed by water. Evaporation of the chloroform gives an oily residue which when triturated with ether yields a yellow crystalline product melting at 142–148° C. The ultraviolet spectrum shows $\lambda\lambda_{max}^{MeOH}$ 220 m$\mu$ ($\epsilon$ 11,400), 251–257 m$\mu$ ($\epsilon$ 10,400), 295–301 m$\mu$ ($\epsilon$ 12,000)

Concentration of the filtrate yields a second crop of product.

When the experiment is repeated omitting the calcium carbonate, the product obtained contains a major proportion of the 3-keto-$\Delta^{4,6}$-analog.

EXAMPLE V $\Delta^{1,4,6}$-pregnatriene-17α,21-diol-3,20-dione 21-acetate

A mixture of 2 g. $\Delta^4$pregnene-17α,21-diol-3,20-dione 21-acetate, 3.5 g. 2,6-dichlorobenzoquinone, and 75 g. glass beads in 80 ml. pentanol-1 is refluxed for 180 minutes. The reaction mixture is then filtered, concentrated in vacuum and vacuum-steam-stripped until shortly after a single-phase distillate begins to collect. The residue is cooled and extracted with methylene chloride. The extract is then washed with a 5% potassium hydroxide solution, with aqueous acetic acid, and with water. Evaporation of the methylene chloride yields the desired product substantially free of the 3-keto-$\Delta^{4,6}$-analog.

EXAMPLE VI $\Delta^{1,4,6}$-pregnatriene-11β,17α,21-triol-3,20-dione 21-acetate $\Delta^{4,6}$-pregnadiene-11β,17α,21-triol-3,20-dione 21-acetate is prepared from $\Delta^4$-pregnene-11β,17α,21-triol-3,20-dione 21-acetate by refluxing with chloranil in 2-methyl propanol-2. A mixture of 5 g. of the $\Delta^6$-compound, 6 g. chloranil and 25 g. calcium carbonate in 200 ml. propanol-1 is heated at 130° C. with stirring in a pressure vessel for 180 minutes. The contents of the vessel are cooled, filtered, and the filtrate is concentrated to a heavy syrup under reduced pressure. The concentrate is extracted with methylene chloride and filtered. The filtrate is then washed free of colored impurities with aqueous 5% potassium hydroxide, followed by dilute acetic acid and water. It is then concentrated to a small volume and benzene is added. Distillation is continued until the vapor temperature is 78–80° C. The resulting slurry is cooled and filtered to obtain the desired solid product in high purity.

EXAMPLE VII $\Delta^{1,4,6}$-pregnatriene-17α,21-diol-3,11,20-trione 21-propionate A mixture of 2 g. of $\Delta^4$-pregnene-17α,21-diol-3,-11,20-trione 21-propionate, 3.5 g. 2,6-dichlorobenzoquinone, and 75 g. glass helices in 80 ml. pentanol-1 is refluxed for 180 minutes. The reaction mixture is then treated as in Example V to recover the product, substantially free of the 3-keto-$\Delta^{4,6}$-analog.

EXAMPLE VIII $\Delta^{1,4,6}$-pregnatriene-11β,21-diol-3,20-dione

A mixture of 2 g. $\Delta^4$-pregnene-11β,21-diol-3,20-dione, 2 g. benzoquinone, and 10 g. strontium carbonate in 80 ml. 2-methyl butanol-4 is refluxed for 75 minutes. The reaction mixture is then treated as in Example V to recover the product, substantially free of the 3-keto-$\Delta^{4,6}$-analog.

EXAMPLE IX $\Delta^{1,4,6}$-pregnatriene-3,20-dione

A mixture of 2 g. $\Delta^4$-pregnene-3,20-dione, 2 g. benzoquinone, and 10 g. strontium carbonate in 80 ml. 2-methyl butanol-4 is refluxed for 60 minutes. The reaction mixture is then treated as in Example V to recover the product, substantially free of the 3-keto-$\Delta^{4,6}$-analog.

EXAMPLE X 2-methyl-$\Delta^{1,4,6}$-pregnatriene-11β,17α,21-triol-3,20-dione 21-acetate A mixture of 2 g. 2-methyl-$\Delta^4$-pregnene-11β,17α,21-triol-3,20-dione 21-acetate, 2.5 g. chloranil, and 10 g. calcium carbonate in 80 ml. propanol-1 is heated at 150° C. with stirring in a pressure vessel for 30 minutes. The reaction mixture is then treated as in Example V to recover the product, substantially free of the 3-keto-$\Delta^{4,6}$-analog.

EXAMPLE XI 6-methyl-$\Delta^{1,4,6}$-pregnatriene-17α,21-diol-3,11,20-trione 21-butyrate A mixture of 2 g. 6-methyl-$\Delta^4$-pregnene-17α,21-diol-3,11,20-trione 21-butyrate, 3 g. chloranil, and 10 g. calcium carbonate in 80 ml. 2-methyl propanol-1 is heated at 130° C. with stirring in a pressure vessel for 75 minutes. The reaction mixture is then treated as in Example V to recover the product, substantially free of the 3-keto-$\Delta^{4,6}$-analog.

EXAMPLE XII $\Delta^{1,4,6}$-androstatriene-3,11,17-trione

A mixture of 2 g. androstane-3,11,17-trione, 4.5 g. chloranil, and 10 g. calcium carbonate in 80 ml. 2-methyl butanol-3 is refluxed for 75 minutes. The reaction mixture is then treated as in Example V to recover the product, substantially free of the 3-keto-$\Delta^{4,6}$-analog.

EXAMPLE XIII $\Delta^{1,4,6}$-pregnatriene-11β,14α,17α,21-tetrol-3,20-dione 21-acetate A mixture of 2 g. $\Delta^4$-pregnene-11β,14α,17α,21-tetrol-3,20-dione 21-acetate, 5 g. chloranil, and 0.7 g. germanium in 80 ml. propanol-1 is heated at 140° C. with stirring in a pressure vessel for 60 minutes. The reection mixture is then treated as in Example V to recover the product, substantially free of the 3-keto-$\Delta^{4,6}$-analog.

EXAMPLE XIV

14α,15α-oxido-$\Delta^{1,4,6}$-pregnatriene-17α,21-diol-3,11,20-trione

A mixture of 2 g. 14α,15α-oxido-allopregnane-17α,21-diol,3,11,20-trione, 4.5 g. chloranil, and 10 g. calcium carbonate in 80 ml. 4-methyl pentanol-2 is refluxed for 120 minutes. The reaction mixture is then treated as in Example V to recover the product, substantially free of the 3-keto-$\Delta^{4,6}$-analog.

EXAMPLE XV $\Delta^{1,4,6,14}$-pregnatetraene-11β,17α,21-triol-3,20-dione 21-benzoate A mixture of 2 g. $\Delta^{14}$-pregnene-11β,17α,21-triol-3,20-dione 21-benzoate, 2 g. hydroquinone, and 10 g. calcium carbonate in 80 ml. 2-methyl butanol-4 is refluxed for 75 minutes. The reaction mixture is then treated as in Example V to recover the product, substantially free of the 3-keto-$\Delta^{4,6}$-analog.

EXAMPLE XVI $\Delta^{1,4,6,9(11)}$-pregnatetraene-17α,21-diol-3,20-dione 21-acetate A mixture of 2 g. $\Delta^{9(11)}$-allopregnene-17α,21-diol-3,20-dione 21-acetate, 7 g. chloranil, and 15 g. calcium carbonate in 80 ml. 2-ethyl hexanol-1 is heated at 150° C. with stirring for 75 minutes. The reaction mixture is then treated as in Example V to recover the product, substantially free of the 3-keto-$\Delta^{4,6}$-analog.

EXAMPLE XVII $\Delta^{1,4,6}$-pregnatriene-11β,16α,21-triol-3,20-dione 21-acetate A mixture of 2 g. $\Delta^4$-pregnene-11β,16α,21-triol-3,20-dione 21-acetate, 3 g. chloranil, and 10 g. calcium carbonate in 80 ml. pentanol-2 is heated at 140° C. with stirring in a pressure vessel for 180 minutes. The reaction mixture is then treated as in Example V to recover the product, substantially free of the 3-keto-$\Delta^{4,6}$-analog.

EXAMPLE XVIII

16β-chloro-$\Delta^{1,4,6}$-pregnatriene-17α,21-diol-3,11,20-trione 21-acetate

A mixture of 2 g. 16β-chloro-$\Delta^4$-pregnene-17α,21-diol-3,11,20-trione 21-acetate, 3 g. chloranil, and 10 g. calcium carbonate in 80 ml. 2-methyl butanol-4 is heated at 140° C. with stirring in a pressure vessel for 180 minutes. The reaction mixture is then treated as in Example V to recover the product, substantially free of the 3-keto-$\Delta^{4,6}$-analog.

What is claimed is:

1. An improved process for the production of a 3-keto-$\Delta^{1,4,6}$-steroid compound having from 18 to 21 carbon atoms in the steroid nucleus, which comprises reacting a compound selected from the group consisting of 3-keto A-ring saturated, 3-keto-$\Delta^4$-, and 3-keto-$\Delta^{4,6}$-steroids, with a quinone having an oxidation-reduction potential of less than about —0.5, at a temperature of from about 110° C. to about 155° C. in a solvent selected from the group consisting of primary and secondary alkanols containing up to nine carbon atoms, in the presence of a particulate solid selected from the group consisting of calcium carbonate, strontium carbonate, germanium and glass.

2. A process as in claim 1 wherein the quinone is chloranil.

3. A process as in claim 1 wherein the quinone is 2,6-dichlorobenzoquinone.

4. A process as in claim 1 wherein the quinone is benzoquinone.

5. A process as in claim 1 wherein the alcohol is propanol-1.

6. A process as in claim 1 wherein the alcohol is 2-methyl butanol-4.

7. In the process of preparing a 3-keto-$\Delta^{1,4,6}$-steroid compound having from 18 to 21 carbon atoms in the steroid nucleus by oxidation of a compound selected from the group consisting of 3-keto A-ring saturated, 3-keto-$\Delta^4$-, and 3-keto-$\Delta^{4,6}$-steroids by a quinone having an oxidation-reduction potential of less than about —0.5, at a temperature of from about 110° C. to about 155° C. in a solvent selected from the group consisting of primary and secondary alkanols containing up to nine carbon atoms, the improvement which comprises carrying out the process in the presence of a particulate solid selected from the group consisting of calcium carbonate, strontium carbonate, germanium and glass.

No references cited.